US011621919B2

(12) United States Patent
Hutchison et al.

(10) Patent No.: US 11,621,919 B2
(45) Date of Patent: Apr. 4, 2023

(54) DYNAMIC LOAD BALANCING IN REACTIVE SYSTEMS

(71) Applicant: International Business Machines Corporation, Armonk, NY (US)

(72) Inventors: Gordon Douglas Hutchison, Eastleigh (GB); Adam John Pilkington, Eastleigh (GB); Graham C. Charters, Hampshire (GB); Timothy J. Mitchell, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/464,743

(22) Filed: Sep. 2, 2021

(65) Prior Publication Data
US 2023/0069598 A1   Mar. 2, 2023

(51) Int. Cl.
*H04L 47/125* (2022.01)
*H04L 41/5009* (2022.01)
*H04L 41/5019* (2022.01)

(52) U.S. Cl.
CPC ........ *H04L 47/125* (2013.01); *H04L 41/5009* (2013.01); *H04L 41/5019* (2013.01)

(58) Field of Classification Search
CPC ............... H04L 47/125; H04L 41/5009; H04L 41/5019
See application file for complete search history.

(56) References Cited

U.S. PATENT DOCUMENTS 9,619,827 B1 *  4/2017  Joneja ................ G06F 9/5011
11,249,790 B1 *  2/2022  Gupta ................ G06F 9/5077
(Continued)

FOREIGN PATENT DOCUMENTS

WO   2020015154 A1   1/2020

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Johnny B Aguiar
(74) *Attorney, Agent, or Firm* — Stephanie L. Carusillo

(57) ABSTRACT

A computer system hosting (micro)services that uses a service mesh to govern communication between the services. The services include consumer services and an event stream service, the latter directing an event stream from a producer service to the individual consumer services. The control plane of the service mesh has the role of creating and removing service instances. Based on a specified event capacity that is to be provided by the consumer services collectively, the control plane manages service provisioning by estimating the current event capacity of the system. This is done by measuring the event capacities of each consumer service instance and summing them, from which any shortfall or excess of the current event capacity in relation to the specified event capacity can be determined. Consumer service instances are then added in case of a shortfall or removed in case of an excess as needed to avoid over or under-provisioning.

17 Claims, 6 Drawing Sheets

(56) References Cited

U.S. PATENT DOCUMENTS

| | | | | |
|---|---|---|---|---|
| 2014/0164623 A1* | 6/2014 | Galan | ................... | G06Q 10/06 |
| | | | | 709/226 |
| 2016/0301624 A1* | 10/2016 | Gonzalez | .............. | G06F 9/5083 |
| 2018/0240163 A1 | 8/2018 | Sivasubramanian | | |
| 2018/0254996 A1* | 9/2018 | Kairali | ................ | H04L 67/1036 |
| 2019/0042314 A1* | 2/2019 | Verrall | ................. | G06F 9/4881 |
| 2020/0136911 A1 | 4/2020 | Assali | | |
| 2020/0236406 A1 | 7/2020 | Bastian | | |
| 2021/0006505 A1* | 1/2021 | Chen | .................... | H04L 47/781 |

OTHER PUBLICATIONS

"Patent Cooperation Treaty PCT International Search Report", Applicant's File Reference: P202004373, International Application No. PCT/EP2022/073569, International Filing Date: Aug. 24, 2022, dated Dec. 12, 2022, 16 pages.
Sun et al., "Istio Explained—Getting Started with Service Mesh", IBM Corporation, USA, Nov. 27, 2019, 91 Pages.
Wuestkamp, Kim, "Scalable Microservice Demo K8s Istio Kafka", ITNEXT, Medium, Mar. 9, 2020, 12 Pages.

* cited by examiner

DYNAMIC LOAD BALANCING IN REACTIVE SYSTEMS

FIELD OF THE INVENTION

The present invention relates generally to load balancing in a computing system, and more particularly to dynamic load balancing in reactive systems.

BACKGROUND

Load-balancing algorithms are widely used in request management, e.g., for managing requests to a website that needs to be able to handle requests at a generally unknown and fluctuating rate. A router receives requests and distributes the requests to available systems according to a load-balancing algorithm. Load balancing can be classified as either static or dynamic, where the former does not take account of the current state of the system, whereas the latter does. Often the load-balancing algorithm will include a mixture of static and dynamic elements in a hybrid approach, e.g. fixed and variable resourcing components.

An example of a simple static load-balancing approach is 'round-robin' load balancing, in which requests are allocated to systems according to a cycle through the available systems, like dealing out playing cards to start a card game. An example of a simple dynamic load-balancing approach would be to queue requests if the producer is busy and to delete requests from the queue if they become older than a threshold age.

Dynamic load balancing may be used to provide automatic scaling of system resources; workload management (WLM); and management to comply with a service level agreement (SLA). Dynamic load balancing will become active when a system stress measurement shows that loading has exceeded a threshold, i.e. become overloaded. Examples of stress-related parameters that may be used to determine when to initiate dynamic load balancing are request processing latency and processor utilization. WLM solutions monitor stress-related parameters and, when they exceed certain thresholds, take action to manage the workload, e.g. by adding new server instances for increasing producer capacity.

Recently there has been growing interest in reactive approaches to load balancing. In a reactive system, an originator of a request is referred to as a producer, a processor of a request is referred to as a consumer, and a request is referred to as an event or item. In the following, the term event is used rather than item. In reactive approaches, consumers of events are put in control of load balancing instead of concentrating management on the producer. Each consumer communicates to the producer to request a new 'batch' of events with the consumers deciding when to send a batch request to the producer based on their own loading. Producers, therefore, do not overload the system since their output is limited by the consumers to a level that can be processed without excessive queuing at the consumers. This reactive approach is referred to as back pressure or ticketing.

In a reactive system, historical information of consumer behavior can be used to load balance, e.g., to scale consumer capacity. Loading and load balancing in reactive systems are commonly expressed through the terms: 'windowing', 'batching', 'response time' or 'latency', and 'burst capacity'.

These terms have the following meanings:
'window' is the initial number of events requested by a consumer from a producer. For example, a consumer might initially request 100 events.
'batch' is the number of events subsequently requested by a consumer. For example, a consumer might subsequently request events in batches of 10. The frequency with which a consumer requests new batches is a function of the consumer's throughput capacity, since the consumer only requests events at the rate it is processing them. For example, if a consumer requests batches of 10 events every 5 seconds then it can be deduced that the consumer can process 2 events per second.
'response time' or 'latency' are measures of how quickly a consumer processes events. Processing of an event includes the consumer receiving the event, performing any actions associated with the event, and providing any required acknowledge back to the producer. This can be estimated using batch size and batch frequency—the rate at which batches are requested and the size of batches requested. Batch size can also affect latency, for example, a consumer able to process 'n' events in parallel is likely to operate most efficiently if the batch size is 'n' and less efficiently with batch sizes that are either much smaller or much bigger than 'n'.
'burst capacity' is the maximum number of simultaneous events that consumers are capable of absorbing, i.e., effectively the buffer size. This may relate to a single consumer or to the whole system, i.e., all consumers collectively.

Since a reactive system pre-emptively avoids system resources becoming stressed, measurements of system stress as used in traditional load-balancing algorithms are no longer diagnostic of system loading. It is no longer transparent how much consumer provisioning is needed. This is, e.g., relevant for load balancing of a system in a cloud environment running microservice-based applications. Therefore, there is a need for different ways of managing workload in reactive systems to ensure there is sufficient capacity available to cope with fluctuating demand.

BRIEF SUMMARY OF THE INVENTION

According to one aspect of the present invention, there is provided a computer system comprising: a plurality of services comprising at least one consumer service and an event stream service for supplying a stream of events from a producer service to a consumer service, each consumer service having an event capacity; and a service mesh comprising a data plane and a control plane, wherein the control plane is configured to create and remove instances of the services, including creating a proxy instance for each service instance, and wherein the data plane is configured to define interrelations between the proxy instances and hence indirectly between the service instances. The control plane being operable to manage provisioning of consumer service instances according to system needs by: defining a specified event capacity to be provided by the consumer services collectively; estimating a current event capacity of the system by measuring the event capacities of each consumer service instance and summing them; determining any shortfall of the current event capacity from the specified burst capacity; and adding at least one further consumer service instance conditional on determining a shortfall in the event capacity sufficient to eliminate the shortfall.

Said measuring of the event capacities of each consumer service instance can be based on windowing and batching information extracted by the control plane from communications to the proxy instance of that consumer service instance.

In certain embodiments, the control plane is further operable to manage provisioning of consumer service instances according to system needs by determining if there is potential over-provisioning of the current event capacity from the specified event capacity and removing at least one consumer service instance conditional on a determination of potential over-provisioning of the event capacity.

The specified event capacity may be set with reference to a service level and/or records of historical values of event capacity that have previously been set for the system.

In certain embodiments, the event capacity comprises an event burst capacity and an event throughput capacity. The specified and current event capacities thus each have burst and throughput elements. Hence, there may be a shortfall in either the event burst capacity or the event throughput capacity or both. In this case, said adding of one or more further consumer service instances is conditional on determining either a shortfall in the event burst capacity or a shortfall in the event throughput capacity or a shortfall in both. The added capacity is selected to be sufficient to eliminate the or each shortfall. In this case, said measuring of the event capacities of each consumer service instance is based on windowing and batching information extracted by the control plane from communications to the proxy instance of that consumer service instance. The windowing information and the batching information is then used to measure the event burst capacity, whereas the batching information, but not the windowing information, is used to measure the event throughput capacity.

When determining the shortfall in the event burst capacity, this can be made more accurate by reducing the specified event burst capacity by an amount to account for how many events are currently pending in the system. This amount may be based on estimates or measurements of the current state of the system or a combination of both. Moreover, the potential over-provisioning is determined separately for event burst capacity and event throughput capacity. Namely, the control plane is further operable to manage provisioning of consumer service instances according to system needs by determining if there is potential over-provisioning of the current event burst capacity from the specified event burst capacity and determining if there is potential over-provisioning of the current event throughput capacity from the specified event throughput capacity. The removal of one or more consumer service instances is then conditional on a determination of potential over-provisioning of both event burst capacity and event throughput capacity, since otherwise removal of over-provisioning in one of the burst and throughput capacity would cause under-provisioning in the other. The specified event burst capacity and the specified event throughput capacity can be set with reference to a service level and/or records of historical values of event burst capacity and event throughput capacity set for the system.

The producer service may be part of or may be external to the system as defined above.

According to a further aspect of the present invention there is provided a load-balancing method for managing a computer system, the method comprising: a plurality of services comprising at least one consumer service and an event stream service for supplying a stream of events from a producer service to a consumer service, each consumer service having an event capacity; and a service mesh comprising a data plane and a control plane, wherein the control plane is configured to create and remove instances of the services, including creating a proxy instance for each service instance, and wherein the data plane is configured to define interrelations between the proxy instances and hence indirectly between the service instances. The method comprising operating the control plane to manage provisioning of consumer service instances according to system needs by: defining a specified event capacity to be provided by the consumer services collectively; estimating a current event capacity of the system by measuring the event capacities of each consumer service instance and summing them; determining any shortfall of the current event capacity from the specified burst capacity; and adding at least one further consumer service instance conditional on determining a shortfall in the event capacity sufficient to eliminate the shortfall.

According to another aspect of the present invention, there is provided a computer program stored on a computer readable medium and loadable into the internal memory of a computing device, comprising software code portions, when said program is run on a computing device, for performing the above-defined method. A computer program product may also be provided which stores the above-mentioned computer program.

BRIEF DESCRIPTION OF THE DRAWINGS

In the following, the present invention will further be described by way of example only with reference to exemplary embodiments illustrated in the Figures.

DETAILED DESCRIPTION

In the following detailed description, for purposes of explanation and not limitation, specific details are set forth in order to provide a better understanding of the present invention. It will be apparent to one skilled in the art that the present invention may be practiced in other embodiments that depart from these specific details.

Embodiments of the present invention are implemented as part of a service mesh. A service mesh is an infrastructure layer for applications, which are based on microservices often referred to as services for short. The service mesh provides logic for governing communication between the microservices and, thus, manages how they are interconnected and how they interact. The service mesh removes these roles from the services themselves. The service interconnections represent a data plane. The service interactions represent a control plane that is defined by communication policies, e.g., for authentication. The data plane and the control plane communicate with each other via an application program interface (API), sometimes called the data plane API. A service mesh is not a mesh of services, but rather each service is assigned a proxy instance, called a sidecar, and it is these sidecars that are meshed. Therefore, the services do not directly communicate with one another, but rather indirectly via their sidecars and the data plane is a representation of the interconnections between the sidecars.

Figure 1:
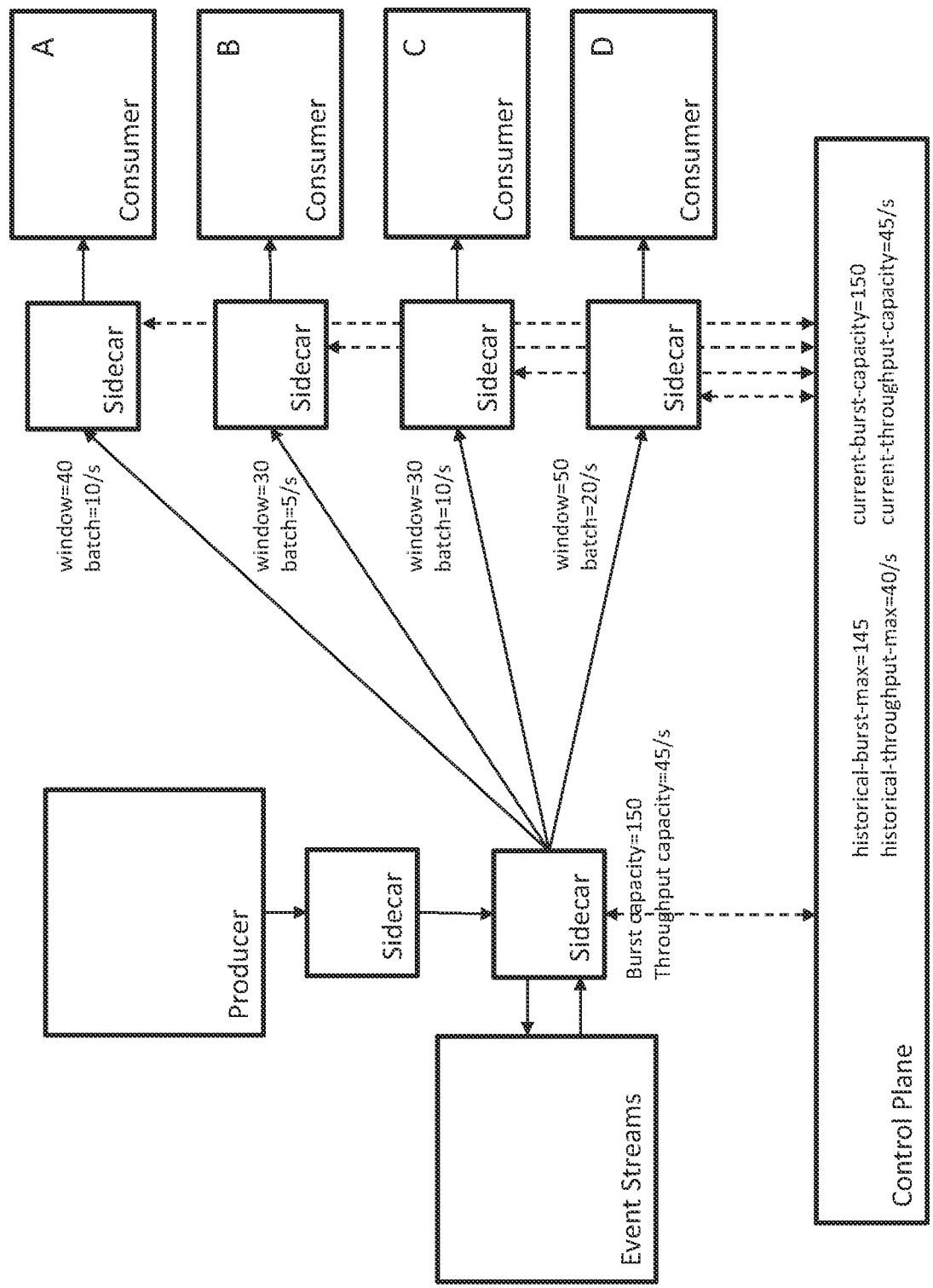
FIG. 1 is a schematic diagram showing a system hosting a microservice application deployment with a service mesh as is suitable for implementing embodiments of the present invention.

FIG. 1 shows a system hosting a microservice application deployment with a service mesh. The deployment has four application service instances, labelled A, B, C, and D, and an event streaming instance to handle an event stream generated by a producer instance. Each application may be identified with a different consumer. The application service instances receive events from the event streaming service instance. Each service instance has its own proxy instance, i.e., sidecar as part of the service mesh. As illustrated with the arrows, the service mesh has a data plane that configures the inter-sidecar communication links such that each of the consumer sidecars has a communication link to the event streams sidecar and the producer sidecar has a communication link to the event streams sidecar. The service mesh further includes a control plane. The sidecars monitor, i.e., snoop, the windowing and batching requests of each consumer. This information is used by the control plane to determine the optimum number of consumers based on the overall burst capacity and overall throughput capacity. To simplify the calculations in the examples given below, it is assumed that the buffers of the consumers are empty. However, in real implementations the calculations may beneficially include an estimate of current buffer content (e.g., based on historical 'windowing' and 'batching' requests) to adjust the burst capacity.

The control plane uses windowing information to determine the system's burst capacity and batching information to determine the system's throughput capacity.

The control plane may use windowing information to determine the system's burst capacity as follows. If the system currently has, e.g., two consumers both of whom make initial windowing requests of 100, then, absent any other measures, the system will be currently provisioned with a burst capacity of 200. The control plane may also use historical burst data to plan how many consumer service instances to deploy in the system. For example, suppose the logs show that the maximum historical burst size is 150, then it can be deduced that the system as provisioned for its current consumers with a burst capacity of 200 has sufficient burst capacity, i.e., 50 more than needed. However, if the logs show that the historical burst maximum is 300, then the system is currently under-provisioned by 100 and will need to provision additional consumer instances to increase the burst capacity from 200 to at least 300. Here 'inflight' events have not been taken into account (i.e., items that relate to as yet unprocessed requests in the event stream), which will reduce the burst capacity, as discussed further below.

The control plane may use batching information to determine the system's throughput capacity as follows. If there are two consumers, where one is requesting batches of 10 every 5 seconds and another is requesting batches of 20 every 10 seconds, then the overall throughput of the system is 4 events per second (10/5+20/10=4).

Furthermore, the control plane may use the batching information on throughput to make a more accurate determination of burst capacity by reducing the burst capacity as determined by windowing alone by an amount that takes account of how many events are already buffered at the consumer instances and therefore not available to cope with a burst. For example, if the burst capacity, based on the windowing values, is 300, but the consumer instances' buffers currently contain 40 events (e.g. the consumers collectively on average issue batches of 80 every 10 seconds and it is 5 seconds since the last batches were requested), then the burst capacity at the current point in time is 260 (300−40=260). The specified event burst capacity is thus reduced by an amount to account for how many events are estimated to be pending based on a combination of batch size, batch frequency, and batch timing. Alternatively, the same accounting could be done based on a real measurement of pending events, e.g., by measuring one or more of 'in-flight events' (events in the event stream), events buffered (i.e., queued) at the consumers, and events currently being processed at the consumers.

The control plane can continually monitor and recalculate burst capacity (from windowing and batching) and throughput capacity (from batching) and use both in combination to adjust provisioning of consumer instances, either up or down, as needed. Thus, the system can be dynamically scaled reacting to evolving workload from the event stream. For example, it may be that initially the burst capacity is the measure that dictates how many consumer instances are required, but a subsequent gradual increase in throughput could lead to a need to grow the number of consumer instances above the number required to cater for the burst capacity alone in order to cope with the increased throughput.

In failover scenarios, where the initial windowing and batching information is not known, the system at restart can initially be provisioned according to values of burst capacity and throughput capacity taken from the failed system. These initial values can then be updated or replaced over time as more details of the required burst capacity and throughput capacity can be deduced from the rebooted or backup system.

The control plane may obtain system information relevant for provisioning in various different ways. For example, the control plane may snoop on reactive communications between the sidecars in order to extract the windowing and batching information. The control plane may use the windowing information as an indicator of total capacity for each instance (e.g., buffer size) and use subsequent batching requests to determine available capacity. For example, if a system initially requests 30 (window) and subsequently requests 10 every 10 seconds (batch), it may deduce that 5 seconds since the last batch request the system has capacity for 5 more. The control plane may make infrastructure measurements, such as to measure buffer sizes, consumer instance offset lag, or work delivery frequency. The control plane may request 'n' sizes, request 'n' frequency. The system information can be used to allow the control plane to determine various parameters, such as: (1) capacity available for handling workload bursts (from outstanding tickets); (2) capacity imbalance between producer and consumer to deduce if there is too much capacity or too little capacity, e.g., is ticket supply adequate or are reserves adequate; and (3) individual consumer instance processing rates.

This deduced information can be used to make decisions on provisioning of the system. This might be a decision to scale the number of consumer instances up or down. It might also be a decision on how to distribute work across the consumer instances, e.g., to meet a defined service level (in an SLA) such as a service level whereby all requests must be processed within a given amount of time.

By monitoring the events/seconds processed by each consumer instance and predicting how many outstanding events each consumer currently has buffered, it is also possible for the control plane to control allocation of new events from the event stream to consumers. Similarly, it is possible to reallocate previously allocated events from one consumer to another. An improved distribution of events across consumers can therefore be achieved.

Figure 2:
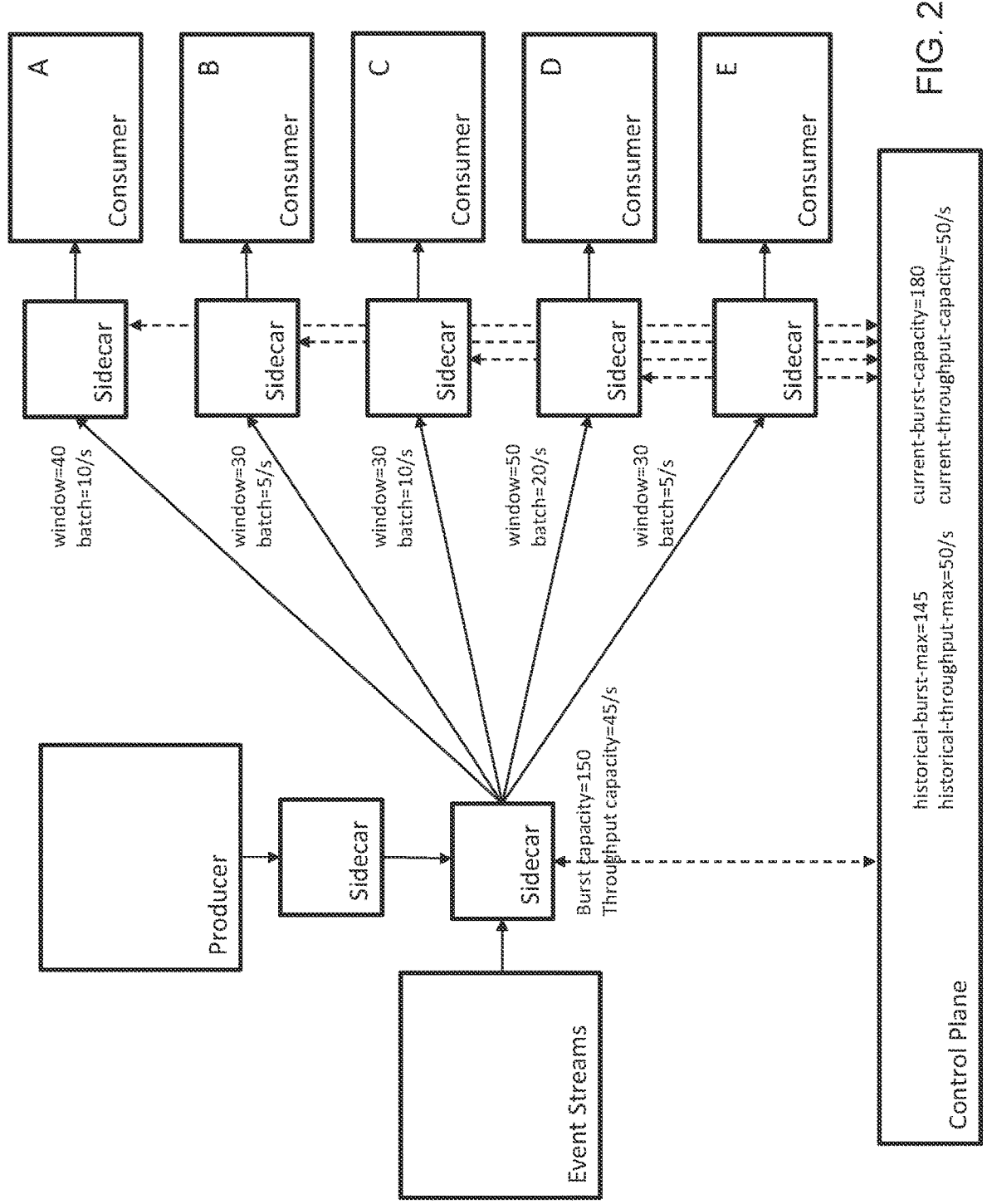
FIG. 2 is a schematic diagram to be compared with FIG. 1, showing an additional consumer service instance, according to an embodiment of the present invention.

The capacity and provisioning as shown in FIG. 1 and FIG. 2 are now discussed and compared by way of a specific example.

FIG. 1 may be understood to show a snapshot in time of the state of the system in which four consumer instances (A-D) are deployed to handle an event stream generated by a producer instance from the event stream instance. The "current burst capacity" across the four consumer instances is 150 and the "current throughput capacity" is 45 events per second. The "historical burst maximum" is 145, which is 5 below the current capacity, and the "historical throughput maximum" is 40 events per second, which is 5 per second below the current throughput capacity. The system could remove instance B to meet the throughput requirement, however, this would reduce the burst capacity to 120, which is 25 below the capacity required for the maximum historical burst. It is noted that, in the system of FIG. 1, burst capacity is the parameter that is determining the number of instances.

FIG. 2 may be understood to show a snapshot of the state of the same system as FIG. 1 but at a later time. Over time, the rate of events supplied in the event stream has increased from 45/s (FIG. 1) to 50/s (FIG. 2). This has taken the system over the 45/s capacity available with four deployed consumer instances (A-D) and this may be expected to start causing problems. The control plane detects the throughput increase, determines the under-provisioning, and provisions an additional, fifth consumer instance E to provide enough additional throughput capacity to cope with the current event rate of 50/s. Suppose the new consumer instance E has a burst capacity (i.e., window) of 30 and a throughput capacity (i.e., batch) of 5 events per second. It is noted that, in the system of FIG. 2, throughput (not burst capacity) is the parameter that is setting the number of instances, since instance E is needed to cope with the increased throughput, whereas the system with instances A-D only was already sufficiently provisioned to manage burst capacity.

In the specific case of an event streaming service that provides a read and write offset, these offsets can be used to control provisioning. For example, the write offset may be where the producer is currently writing new events and the read offset is where the consumer is currently reading new events. Each consumer's offset provides a measure of how well that consumer is keeping up with its workload and when aggregated across all consumers shows how well the consumers collectively are coping with the production of new events. Specifically, the magnitude of the offset difference is an indicator of the number of unprocessed events, an increasing or decreasing offset is an indicator respectively of under-provisioning or over-provisioning of consumers, and the rate of change of the offset is an indicator of the degree of provisioning mismatch. For example, if the consumer offset is measured to be large, this indicates that the consumers collectively have fallen behind in their event processing, and the control plane can act to provision more consumers to the consumer group to clear the backlog. On the other hand, if the consumer offset has been small, e.g., below a certain threshold, over a longer period of time, then it is likely there is over-provisioning of consumers and the control plane can act to reduce the number of consumers in the consumer group. In a reactive system, a reduction decision may be further conditional on a measure of event production, e.g., to determine there is no significant back pressure on event production.

Figure 3:
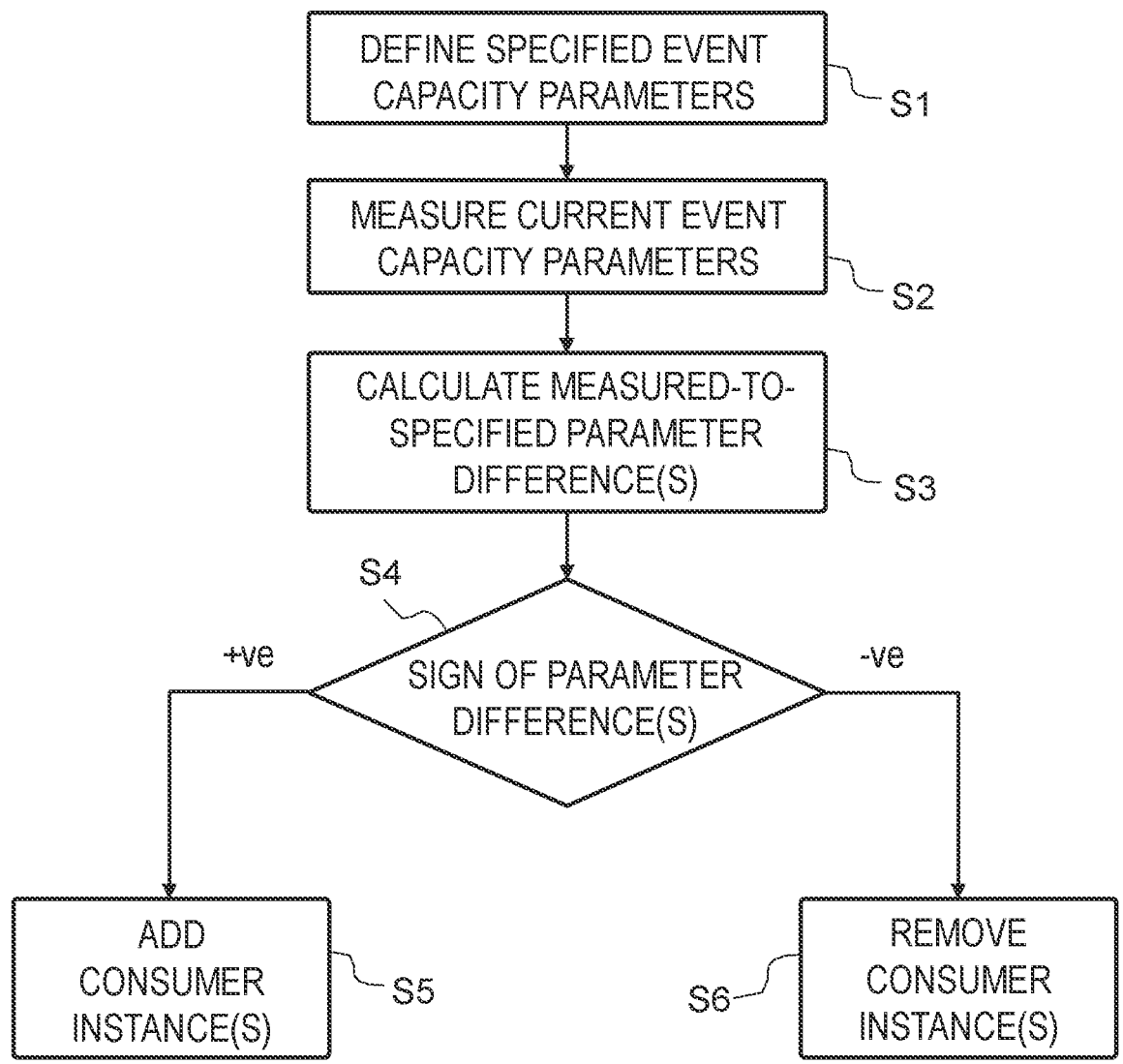
FIG. 3 is a flow diagram of an example implementation of the present invention.

FIG. 3 is a flow diagram of an example method of implementation showing how logic in the control plane manages provisioning of consumer service instances according to system needs.

In Step S1, a specified event burst capacity to be provided by the consumer services collectively is defined. Moreover, a specified event throughput capacity to be provided by the consumer services collectively is also defined. These may be taken from historical data as may be accessible from an analysis of system logs, for example.

In Step S2, an estimate is made of current event burst capacity of the system by measuring the event burst capacities of each consumer service instance and summing them. Moreover, an estimate is made of current event throughput capacity of the system by measuring the event throughput capacities of each consumer service instance and summing them.

In Step S3, the difference between the current event burst capacity and the specified burst capacity is determined. Moreover, the difference between the current event throughput capacity and the specified throughput capacity is determined.

In Step S4, it is tested whether there is a positive difference, i.e., a shortfall of provisioning, in either the event burst capacity or the event throughput capacity, or both.

In Step S5, if Step S4 determines a shortfall in either the event burst capacity or the event throughput capacity or both, then one or more consumer service instances are added to the system. The extra instance(s) that are added provide an additional event burst capacity and/or event throughput capacity. This additional event burst and/or throughput capacity is selected to be of a magnitude at least as large as the shortfall or each shortfall, so that the amount of additional capacity is sufficient to eliminate the shortfall(s).

In Step S6, if Step S4 determines an over-provisioning in both the event burst capacity and the event throughput capacity, then one or more consumer service instances are removed from the system. The removed consumer service instance(s) are selected to have event burst capacities and event throughput capacities that are each lower than the estimated amount of over-provisioning, so that after the service instance(s) have been removed, the total remaining event burst capacity and event throughput capacity are each still greater than their respective specified values.

After Steps S5 and S6, flow returns to Step S2, so that provisioning of the system is continually reassessed, e.g., at regular time intervals.

In summary, based on a specified event capacity that is to be provided by the consumer services collectively, the control plane manages service provisioning by estimating the current event capacity of the system. This is done by measuring the event capacities of each consumer service instance and summing them, from which any shortfall or excess of the current event capacity in relation to the specified event capacity can be determined. One or more consumer service instances are then added in case of a shortfall or removed in case of an excess, as needed to avoid over- or under-provisioning.

Figure 4:
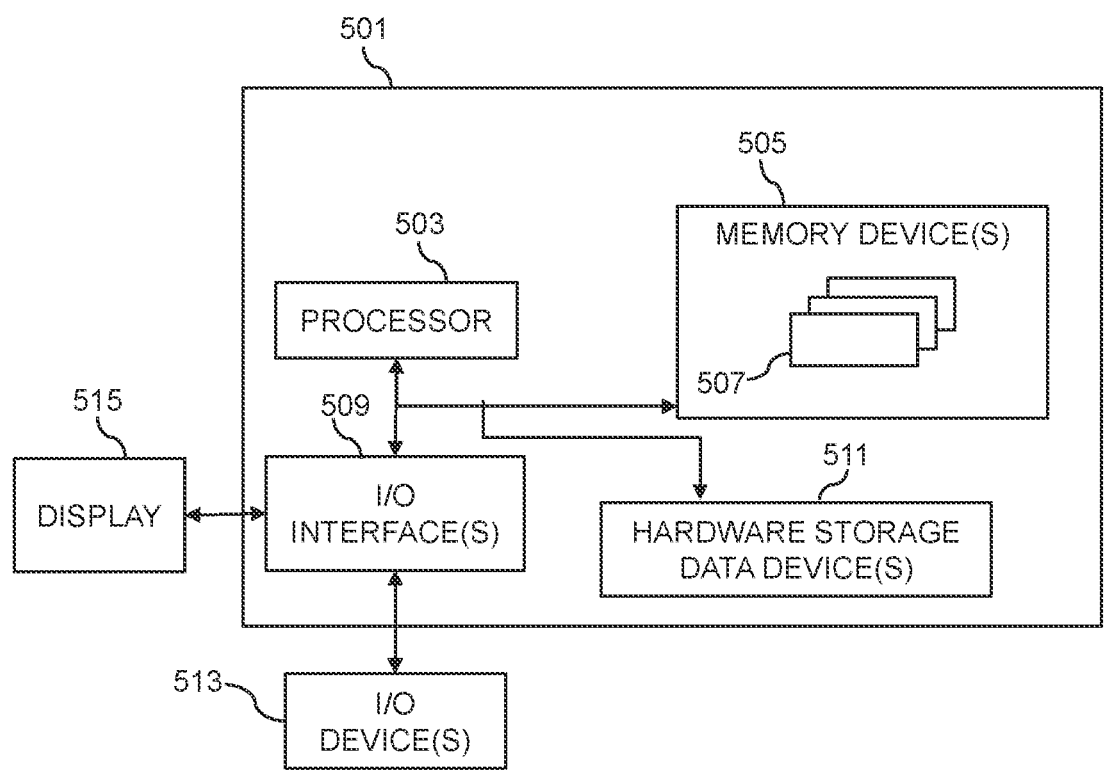
FIG. 4 shows a generic computer device which may be used as part of a computer system according to some embodiments of the present invention.

FIG. 4 shows a structure of a computer system 501 and computer program 507 that may be used to implement embodiments of the present invention, wherein the computer system may be a network node, such as a client or a server, such as the application server or third-party server referred to above, and the computer program 507 may be an application or an artefact. The computer system 501 comprises a processor 503 to provide a processor resource coupled through one or more input/output (I/O) interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 to provide a memory resource contains stored computer program 507, which is a computer program that comprises computer-executable instructions. The data storage devices 511 may store the computer program 507. The computer program 507 stored in the storage devices 511 is configured to be executed by processor 503 via the memory devices 505. The processor 503 executes the stored computer program 507.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistant (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 5:
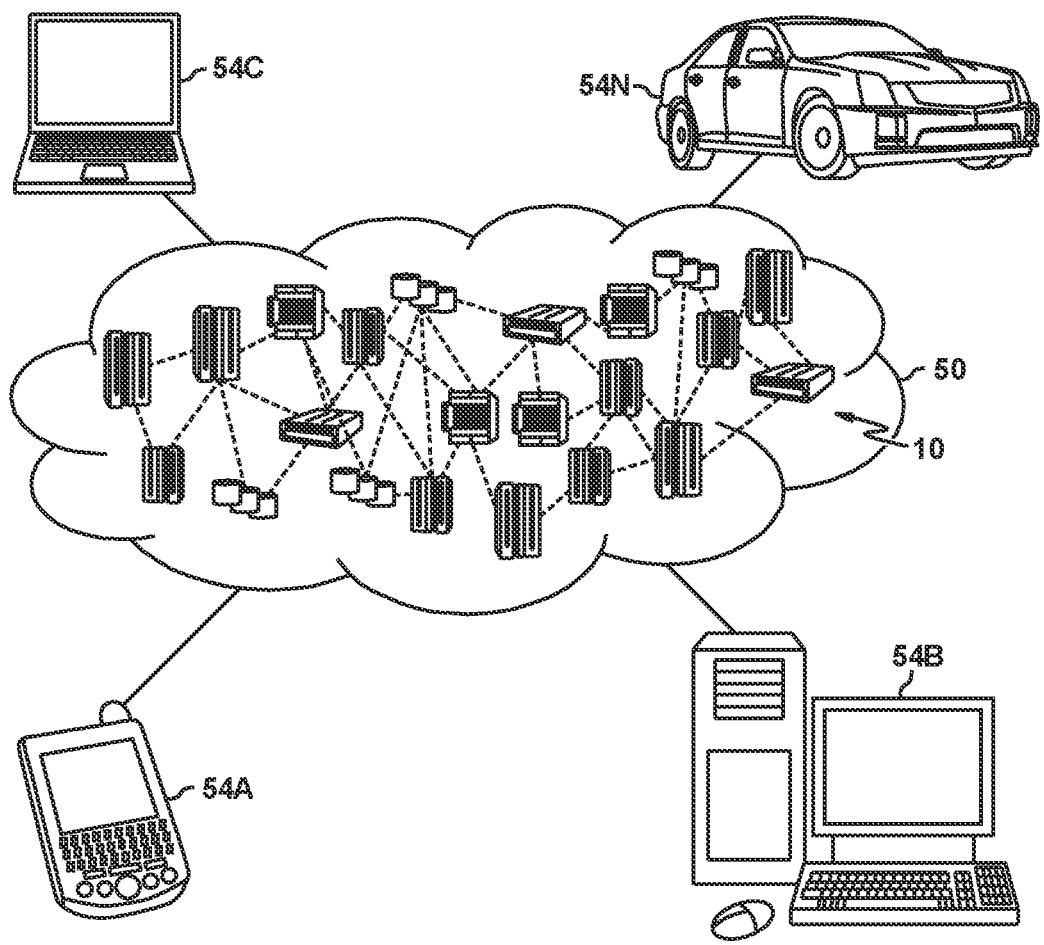
FIG. 5 depicts a cloud computer system according to an embodiment of the present invention.

Referring now to FIG. 5, illustrative cloud computer system 50 is depicted. As shown, cloud computer system 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computer system 50 can communicate with any type of computerized device over any type of network and/or network addressable connection (e.g., using a web browser).

Figure 6:
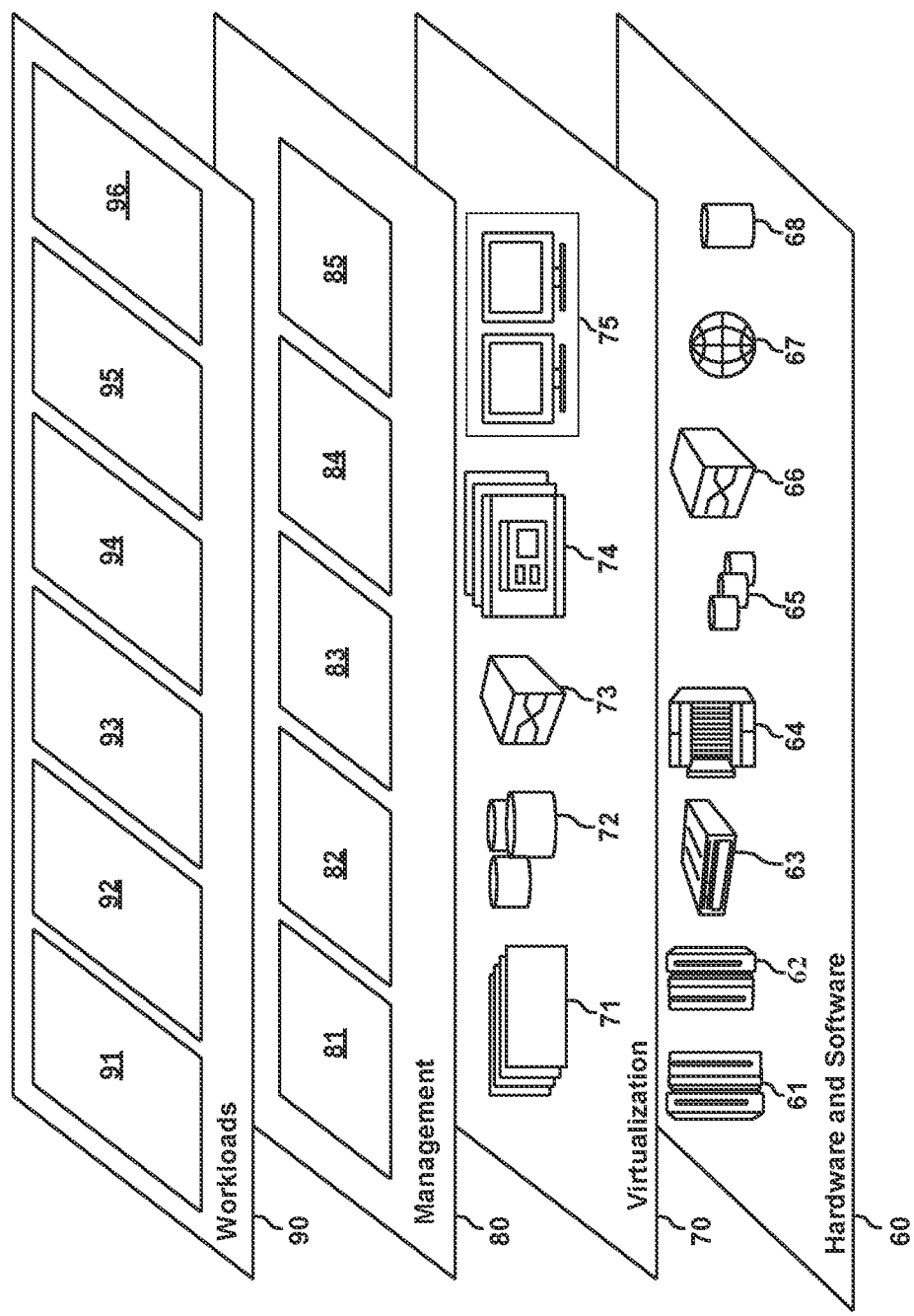
FIG. 6 depicts abstraction model layers according to an embodiment of the present invention.

Referring now to FIG. 6, a set of functional abstraction layers provided by cloud computer system 50 (FIG. 5) is shown. It should be understood in advance that the components, layers, and functions shown in FIG. 6 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include: mapping and navigation 91; software lifecycle management 92; virtual classroom education delivery 93; data analytics processing 94; transaction processing 95; and a service mesh 96 according to embodiments of the present invention.

It will be clear to one skilled in the art that many improvements and modifications can be made to the foregoing exemplary embodiment without departing from the scope of the present invention.

What is claimed is:

1. A computer system comprising:
  a plurality of services, the plurality of services comprising at least one consumer service and an event stream service for supplying a stream of events from a producer service to the at least one consumer service, each consumer service having an event capacity; and
  a service mesh, the service mesh comprising a data plane and a control plane, wherein the control plane is configured to create and remove instances of the plurality of services, including creating a proxy instance for each service instance, and wherein the data plane is configured to define interrelations between the proxy instances and hence indirectly between the service instances;
  wherein the control plane is operable to manage provisioning of consumer service instances according to the computer system needs by:
    defining a specified event capacity to be provided by the consumer services instances collectively;
    estimating a current event capacity of the computer system by measuring and summing the event capacities of each consumer service instance;
    determining any shortfalls of the current event capacity from the specified event capacity; and
    adding at least one further consumer service instance conditional on determining a shortfall in the current event capacity sufficient to eliminate the shortfall;
  wherein the event capacity comprises an event burst capacity and an event throughput capacity, the specified and current event capacities thus each having burst and throughput elements, and wherein any shortfall also has burst and throughput elements;
  wherein said conditional adding of at least one further consumer service instance is conditional on determining a respective shortfall in at least one of the event burst capacity and the event throughput capacity sufficient to eliminate the respective shortfall or each shortfall element;
  wherein said measuring of the event capacities of each consumer service instance is based on windowing and batching information extracted by the control plane from communications to a particular proxy instance of a particular consumer service instance; and
  wherein both the windowing information and the batching information are used to measure the event burst capacity, whereas the batching information but not the windowing information is used to measure the event throughput capacity.

2. The computer system of claim 1, wherein said measuring of the event capacities of each consumer service instance is based on windowing and batching information extracted by the control plane from communications to the particular proxy instance of the particular consumer service instance.

3. The computer system of claim 1, wherein the control plane is further operable to manage provisioning of consumer service instances according to the computer system needs by:
  determining if there is potential over-provisioning of the current event capacity from the specified event capacity; and
  removing at least one consumer service instance conditional on a determination of potential over-provisioning of the current event capacity.

4. The computer system of claim 1, wherein the specified event capacity is set with reference to a service level.

5. The computer system of claim 1, wherein the specified event capacity is set with reference to records of historical values of event capacity set for the computer system.

6. The computer system of claim 1, wherein the specified event capacity is set with reference to a service level and records of historical values of event capacity set for the computer system.

7. The computer system of claim 1, wherein, when determining the respective shortfall in the event burst capacity, the specified event burst capacity is reduced by an amount to account for how many events are currently pending in the computer system.

8. The computer system of claim 1, wherein the control plane is further operable to manage provisioning of consumer service instances according to the computer system needs by:
  determining if there is potential over-provisioning of the current event burst capacity from the specified event burst capacity;
  determining if there is potential over-provisioning of the current event throughput capacity from the specified event throughput capacity; and
  removing at least one consumer service instance conditional on a determination of potential over-provisioning of both the current event burst capacity and the current event throughput capacity.

9. The computer system of claim 1, wherein the specified event burst capacity and the specified event throughput capacity are set with reference to a service level.

10. The computer system of claim 1, wherein the specified event burst capacity and the specified event throughput capacity are set with reference to records of historical values of event burst capacity and event throughput capacity set for the computer system.

11. The computer system of claim 1, wherein the specified event burst capacity and the specified event throughput capacity are set with reference to a service level and to records of historical values of event burst capacity and event throughput capacity set for the computer system.

12. The computer system of claim 1, wherein the producer service is part of the computer system.

13. The computer system of claim 1, wherein the producer service is external to the computer system.

14. A method for load balancing in a computer system, the method comprising:
  providing a plurality of services, the plurality of services comprising at least one consumer service and an event stream service for supplying a stream of events from a producer service to the at least one consumer service, each consumer service having an event capacity; and
  providing a service mesh, the service mesh comprising a data plane and a control plane, wherein the control plane is configured to create and remove instances of the plurality of services, including creating a proxy instance for each service instance, and wherein the data plane is configured to define interrelations between the proxy instances and hence indirectly between the service instances,
  wherein the control plane is operable to manage provisioning of consumer service instances according to computer system needs by:
    defining a specified event capacity to be provided by the at least one consumer services instances collectively;
    estimating a current event capacity of the computer system by measuring and summing the event capacities of each consumer service instance;
    determining any shortfalls of the current event capacity from the specified burst capacity; and
    adding at least one further consumer service instance conditional on determining a shortfall in the current event capacity sufficient to eliminate the shortfall;
  wherein the event capacity comprises an event burst capacity and an event throughput capacity, the specified and current event capacities thus each having burst and throughput elements, and wherein any shortfall also has burst and throughput elements;
  wherein said conditional adding of at least one further consumer service instance is conditional on determining a respective shortfall in at least one of the event burst capacity and the event throughput capacity sufficient to eliminate the respective shortfall or each shortfall element;
  wherein said measuring of the event capacities of each consumer service instance is based on windowing and batching information extracted by the control plane from communications to a particular proxy instance of a particular consumer service instance; and
  wherein both the windowing information and the batching information are used to measure the event burst capacity, whereas the batching information but not the windowing information is used to measure the event throughput capacity.

15. The method of claim 14, wherein the control plane is further operated to manage provisioning of consumer service instances according to the computer system needs by:
  determining if there is potential over-provisioning of the current event capacity from the specified event capacity; and
  removing at least one consumer service instance conditional on a determination of potential over-provisioning of the current event capacity.

16. A computer program product comprising one or more computer readable storage mediums and program instructions collectively stored on the one or more computer readable storage mediums, the stored program instructions to perform a method for load balancing in a computer system, the method comprising:
  providing a plurality of services, the plurality of services comprising at least one consumer service and an event stream service for supplying a stream of events from a producer service to the at least one consumer service, each consumer service having an event capacity; and
  providing a service mesh, the service mesh comprising a data plane and a control plane, wherein the control plane is configured to create and remove instances of the services, including creating a proxy instance for each service instance, and wherein the data plane is configured to define interrelations between the proxy instances and hence indirectly between the service instances,
  operating the control plane to manage provisioning of consumer service instances according to computer system needs by:
    defining a specified event capacity to be provided by the at least one consumer services collectively;
    estimating a current event capacity of the computer system by measuring and summing the event capacities of each consumer service instance;
    determining any shortfall of the current event capacity from the specified burst capacity; and
    adding at least one further consumer service instance conditional on determining a shortfall in the current event capacity sufficient to eliminate the shortfall;

wherein the event capacity comprises an event burst capacity and an event throughput capacity, the specified and current event capacities thus each having burst and throughput elements, and wherein any shortfall also has burst and throughput elements;

wherein said conditional adding of at least one further consumer service instance is conditional on determining a respective shortfall in at least one of the event burst capacity and the event throughput capacity sufficient to eliminate the respective shortfall or each shortfall element;

wherein said measuring of the event capacities of each consumer service instance is based on windowing and batching information extracted by the control plane from communications to a particular proxy instance of a particular consumer service instance; and wherein both the windowing information and the batching information are used to measure the event burst capacity, whereas the batching information but not the windowing information is used to measure the event throughput capacity.

17. The computer program product of claim 16, wherein the control plane is further operated to manage provisioning of consumer service instances according to system needs by:

determining if there is potential over-provisioning of the current event capacity from the specified event capacity; and removing at least one consumer service instance conditional on a determination of potential over-provisioning of the current event capacity.

\* \* \* \* \*